United States Patent
Mittal et al.

(10) Patent No.: US 8,098,290 B2
(45) Date of Patent: Jan. 17, 2012

(54) MULTIPLE CAMERA SYSTEM FOR OBTAINING HIGH RESOLUTION IMAGES OF OBJECTS

(75) Inventors: Anurag Mittal, Plainsboro, NJ (US); Nikolaos Paragios, Paris (FR); Visvanathan Ramesh, Plainsboro, NJ (US)

(73) Assignee: Siemens Corporation, Iselin, NJ (US)

( * ) Notice: Subject to any disclaimer, the term of this patent is extended or adjusted under 35 U.S.C. 154(b) by 929 days.

(21) Appl. No.: 11/042,125

(22) Filed: Jan. 24, 2005

(65) Prior Publication Data

US 2005/0237390 A1    Oct. 27, 2005

Related U.S. Application Data

(60) Provisional application No. 60/540,546, filed on Jan. 30, 2004.

(51) Int. Cl.
H04N 5/232 (2006.01)
H04N 7/18 (2006.01)
H04N 5/225 (2006.01)

(52) U.S. Cl. ............. 348/211.11; 348/159; 348/169

(58) Field of Classification Search ............. 348/169, 348/170, 218.1, 187, 138–153, 211.11, 211.3, 348/208.14, 211.12, 159, 157, 240.99, 333.1; 345/649

See application file for complete search history.

(56) References Cited

U.S. PATENT DOCUMENTS

| | | | | |
|---|---|---|---|---|
| 5,434,617 A * | 7/1995 | Bianchi | | 348/170 |
| 6,215,519 B1 * | 4/2001 | Nayar et al. | | 348/159 |
| 6,853,809 B2 * | 2/2005 | Pelletier | | 396/85 |
| 6,985,175 B2 * | 1/2006 | Iwai et al. | | 348/187 |
| 7,027,083 B2 * | 4/2006 | Kanade et al. | | 348/159 |
| 7,256,817 B2 * | 8/2007 | Yata | | 348/143 |
| 7,307,654 B2 * | 12/2007 | Chang | | 348/218.1 |
| 2002/0113878 A1 * | 8/2002 | Iwai et al. | | 348/187 |
| 2002/0167537 A1 * | 11/2002 | Trajkovic | | 345/649 |
| 2003/0179294 A1 * | 9/2003 | Martins | | 348/157 |

OTHER PUBLICATIONS

Kang, et al. Continuous Tracking Within and Across Camera Streams (XP-10644907), Published in Proceedings/ 2003 IEEE Computer Society Conference on Computer Vision and Pattern Recognition, vol. 1, Jun. 18, 2003 (pp. 267-272); Magazine.

Lim, et al. A Scalable Image-Based Multi-Camera Visual Surveillance System (XP-10648386), Published in Advanced Video and Signal Based Surveillance, Proceedings IEEE Conference, Jul. 21, 2003 (pp. 205-212); Magazine.

(Continued)

Primary Examiner — David Ometz
Assistant Examiner — Ahmed A Berhan
(74) Attorney, Agent, or Firm — Donald B. Paschburg; F. Chau & Associates, LLC

(57) ABSTRACT

A system and corresponding method for image acquisition are provided, the system including a processor, an imaging adapter in signal communication with the processor for receiving image data from each of a static imaging device and a dynamic imaging device, and a homography unit in signal communication with the processor for computing a planar homography between the static and dynamic image data; and the method including receiving an image from a static imaging device, receiving an image from a dynamic imaging device, and registering the dynamic image to the static image using planar homography.

22 Claims, 5 Drawing Sheets

OTHER PUBLICATIONS

Peixoto, et al. Integration of Information From Several Vision Systems for a Common Task of Surveillance, Published in Robotics and Autonomous Systems, Elsevier Science Publishers, vol. 31, No. 1-2, Apr. 30, 2000 (pp. 99-108); Magazine.

Stauffer, et al. Automated Multi-Camera Planar Tracking Correspondence Modeling (XP-10644906), Published in Proceedings/ 2003 IEEE Computer Society Conference on Computer Vision and Pattern Recognition, vol. 1, Jun. 18, 2003 (pp. 259-266); Magazine.

Hartley, at al. Multiview Geometry in Computer Vision, Second Edition (XP-2555024), Reprint of the second edition published in 2003, Cambridge University Press; Magazine.

* cited by examiner

MULTIPLE CAMERA SYSTEM FOR OBTAINING HIGH RESOLUTION IMAGES OF OBJECTS

CROSS-REFERENCE TO RELATED APPLICATION

This application claims the benefit of U.S. Provisional Application Ser. No. 60/540,546, filed Jan. 30, 2004 and entitled "A Multiple Camera System for Obtaining High Resolution Images of Objects", which is incorporated herein by reference in its entirety.

BACKGROUND

With the increased importance of securing many medium-to-large-scale sites, the use of video cameras to obtain information about the activities in the site is typical. In many such sites, personnel monitor multiple video streams, and they may also manually control dynamic pan-tilt-zoom (PTZ) cameras to obtain more detailed information about the observed objects of interest.

Multi-camera vision systems have been developed using a wide range of camera arrangements for various purposes. For better stereo matching, some systems use closely spaced cameras. Others adopt the opposite arrangement of widely separated cameras for maximum visibility. Some may use a hybrid approach. Still others use multiple cameras for the main purpose of increasing the field of view. Various methods for finding planar correspondences across cameras have also been suggested.

Accordingly, what is desired is a system and method for detecting objects of interest and controlling dynamic cameras to obtained detailed views of objects.

SUMMARY

These and other drawbacks and disadvantages of the prior art are addressed by a multiple camera system and method for obtaining high-resolution images of objects.

A system for image acquisition is provided, including a processor, an imaging adapter in signal communication with the processor for receiving image data from each of a static imaging device and a dynamic imaging device, and a homography unit in signal communication with the processor for computing a planar homography between the static and dynamic image data A corresponding method for image acquisition is provided, the method including receiving an image from a static imaging device, receiving an image from a dynamic imaging device, and registering the dynamic image to the static image using a planar homography.

These and other aspects, features and advantages of the present disclosure will become apparent from the following description of exemplary embodiments, which is to be read in connection with the accompanying drawings.

BRIEF DESCRIPTION OF THE DRAWINGS

The present disclosure teaches a multiple camera system and method for obtaining high-resolution images of objects in accordance with the following exemplary figures, in which.

DETAILED DESCRIPTION OF PREFERRED EMBODIMENTS

An exemplary system embodiment of the present disclosure utilizes multiple cameras, including static cameras as well as dynamic pan-tilt-zoom (PTZ) cameras for obtaining high-resolution images of objects. In the exemplary system, static cameras, each with a wide field of view, are used to obtain high-level information about a large part of a scene. Such cameras may be placed to look at different parts of the scene, or at the same scene from different viewpoints to handle occlusion problems due to trees, poles and the like. Object detection may be performed in these views using standard background subtraction techniques. This information is then used by the exemplary system to control the moving PTZ cameras to aim at detected objects of interest. Such information transfer across cameras is performed using planar homographies. The homographies enable the transfer of points lying on a plane.

Since outdoor scenes generally have a dominant ground plane or set of planes, such homography-based point transfer is feasible for most outdoor scenes. When multiple objects of interest are present in the scene and one or multiple PTZ cameras are available, an optimization procedure is utilized to schedule or control the motion of the PTZ cameras such that information about the maximum number of objects of interest in the scene is captured by at least one of the dynamic cameras. Such scheduling utilizes learned information about object trajectories so that the objects that are expected to disappear sooner are captured before objects that are expected to be visible for a longer period of time.

Figure 1:
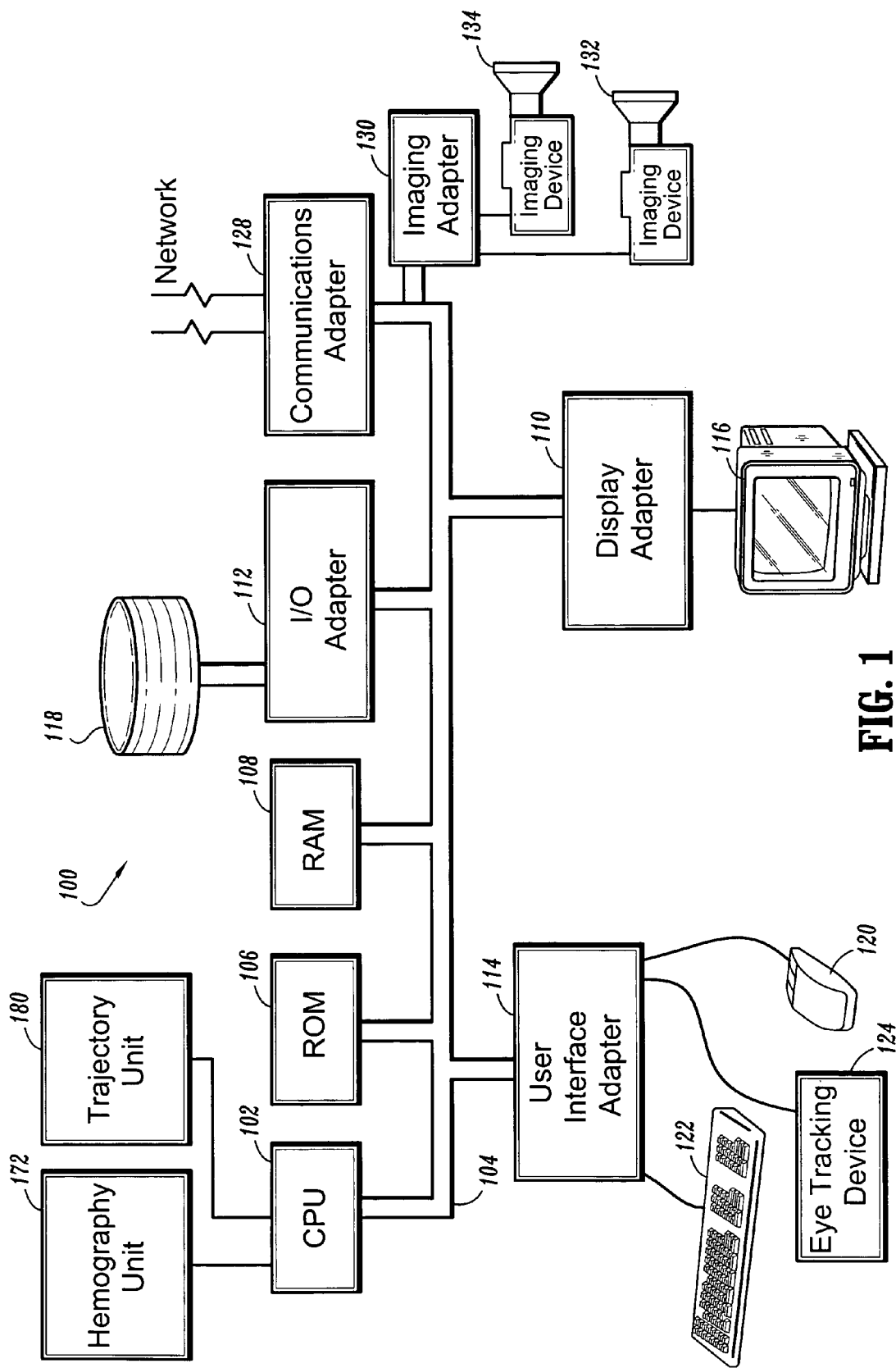
FIG. 1 shows a schematic diagram of a system for obtaining high-resolution images of objects in accordance with an illustrative embodiment of the present disclosure.

As shown in FIG. 1, a multiple camera system for obtaining high-resolution images of objects, according to an illustrative embodiment of the present disclosure, is indicated generally by the reference numeral 100. The system 100 includes at least one processor or central processing unit (CPU) 102 in signal communication with a system bus 104. A read only memory (ROM) 106, a random access memory (RAM) 108, a display adapter 110, an I/O adapter 112, a user interface adapter 114, a communications adapter 128, and an imaging adapter 130 are also in signal communication with the system bus 104. A display unit 116 is in signal communication with the system bus 104 via the display adapter 110. A disk storage unit 118, such as, for example, a magnetic or optical disk storage unit is in signal communication with the system bus 104 via the I/O adapter 112. A mouse 120, a keyboard 122, and an eye tracking device 124 are in signal communication with the system bus 104 via the user interface adapter 114. A static imaging device 132 is in signal communication with the system bus 104 via the imaging adapter 130, and a dynamic imaging device 134 is in signal communication with the system bus 104 via the imaging adapter 130.

A homography unit 172 and a trajectory unit 180 are also included in the system 100 and in signal communication with the CPU 102 and the system bus 104. While the homography unit 172 and the trajectory unit 180 are illustrated as coupled to the at least one processor or CPU 102, these components are preferably embodied in computer program code stored in at least one of the memories 106, 108 and 118, wherein the computer program code is executed by the CPU 102.

As will be recognized by those of ordinary skill in the pertinent art based on the teachings herein, alternate embodiments are possible, such as, for example, embodying some or all of the computer program code in registers located on the processor chip 102. Given the teachings of the disclosure provided herein, those of ordinary skill in the pertinent art will contemplate various alternate configurations and implementations of the homography unit 172 and the trajectory unit 180, as well as the other elements of the system 100, while practicing within the scope and spirit of the present disclosure.

Figure 2:
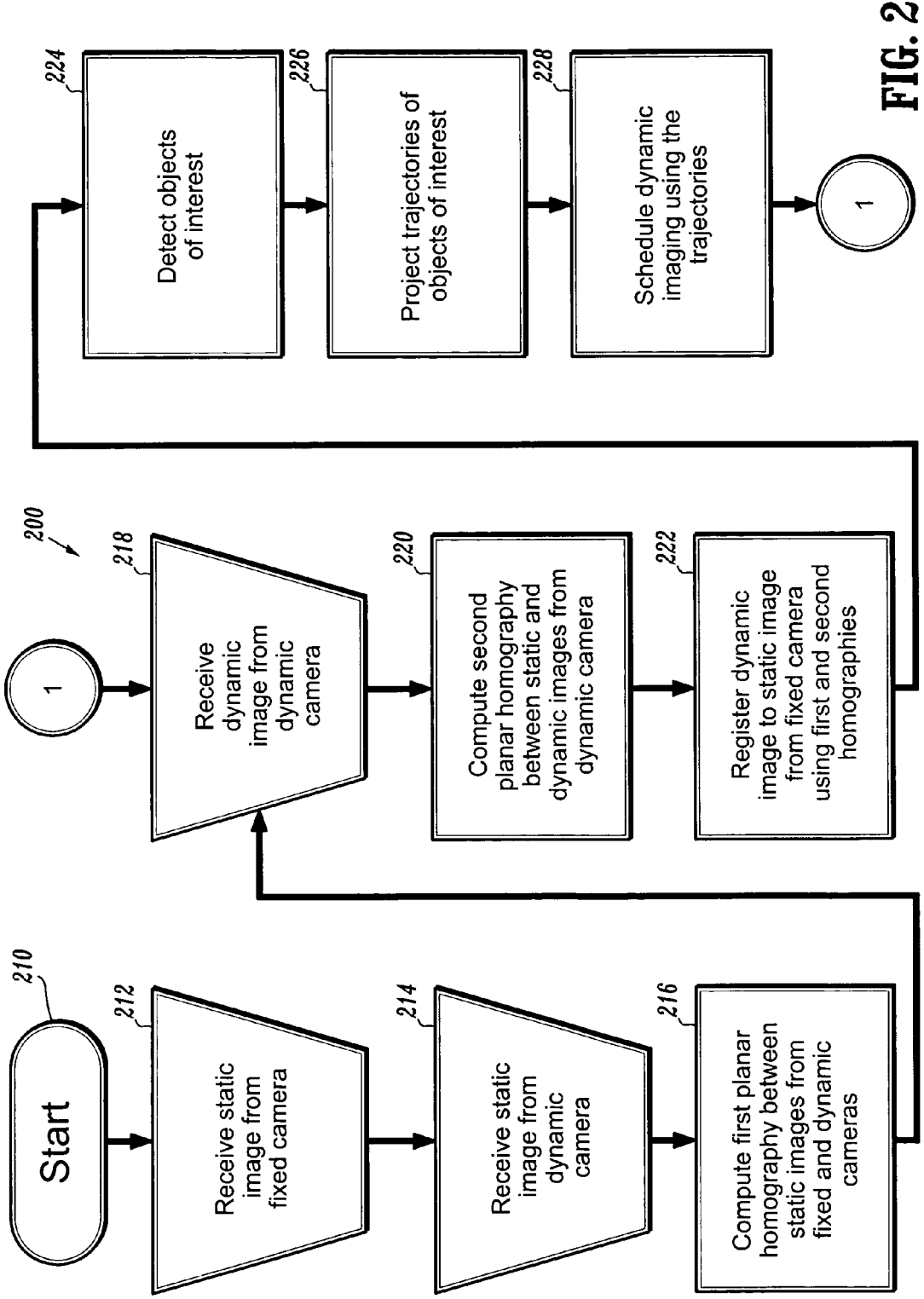
FIG. 2 shows a flow diagram of a method for obtaining high-resolution images of objects in accordance with an illustrative embodiment of the present disclosure.

Turning to FIG. 2, a flowchart for obtaining high-resolution images of objects, according to an illustrative embodiment of the present disclosure, is indicated generally by the reference numeral 200. The flowchart 200 includes a start block 210 that passes control to an input block 212. The input block 212 receives static image data from a fixed camera and passes control to an input block 214. The input block 214 receives static image data from a dynamic camera and passes control to a function block 216.

The function block 216 computes a first planar homography for the static image data and passes control to an input block 218. The input block 218 receives dynamic image data from the dynamic camera, and passes control to a function block 220. The function block 220 computes a second planar homography between the static and dynamic images from the dynamic camera, and passes control to a function block 222. The function block 222 registers the dynamic image to the fixed image in correspondence with the first and second computed homographies, and passes control to a function block 224. The function block 224, in turn, detects objects of interest and passes control to a function block 226. The function block 226 projects trajectories of the objects of interest in response to the registered image data, and passes control to a function block 228. The function block 228 schedules or controls the dynamic imaging of objects in response to the object trajectories, and passes control back to the input block 218 for receiving more dynamic image data. One or more of the function blocks 216, 220, 222, 224, 226 and 228 may use supplemental data obtained at different points in time from the current dynamic image data.

Figure 3:
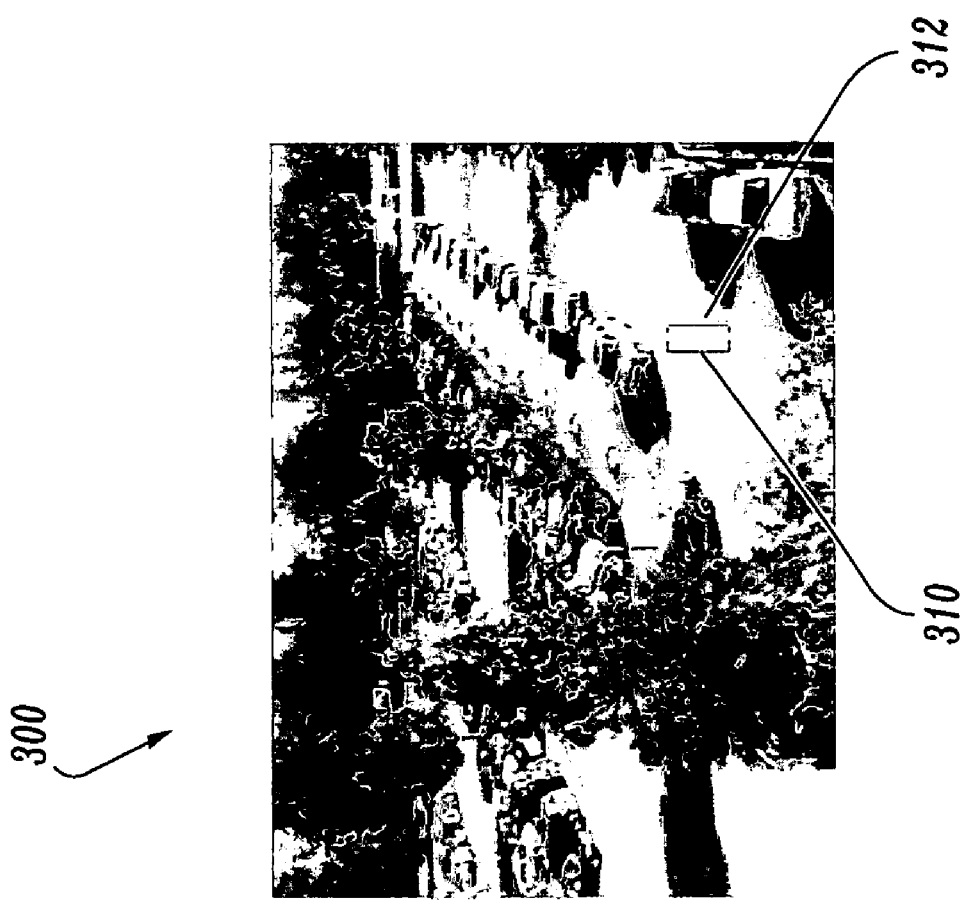
FIG. 3 shows an image diagram with schematic overlay of regions for the use of dynamic programming in accordance with an illustrative embodiment of the present disclosure.

Turning now to FIG. 3, an individual image is indicated generally by the reference numeral 300, with regions 310 and 312 showing the use of dynamic programming to efficiently compute summations in the projection regions. The two adjacent regions 310 and 312 have overlapping area, and given the result for one, the result for the other can be computed efficiently.

Figure 4:
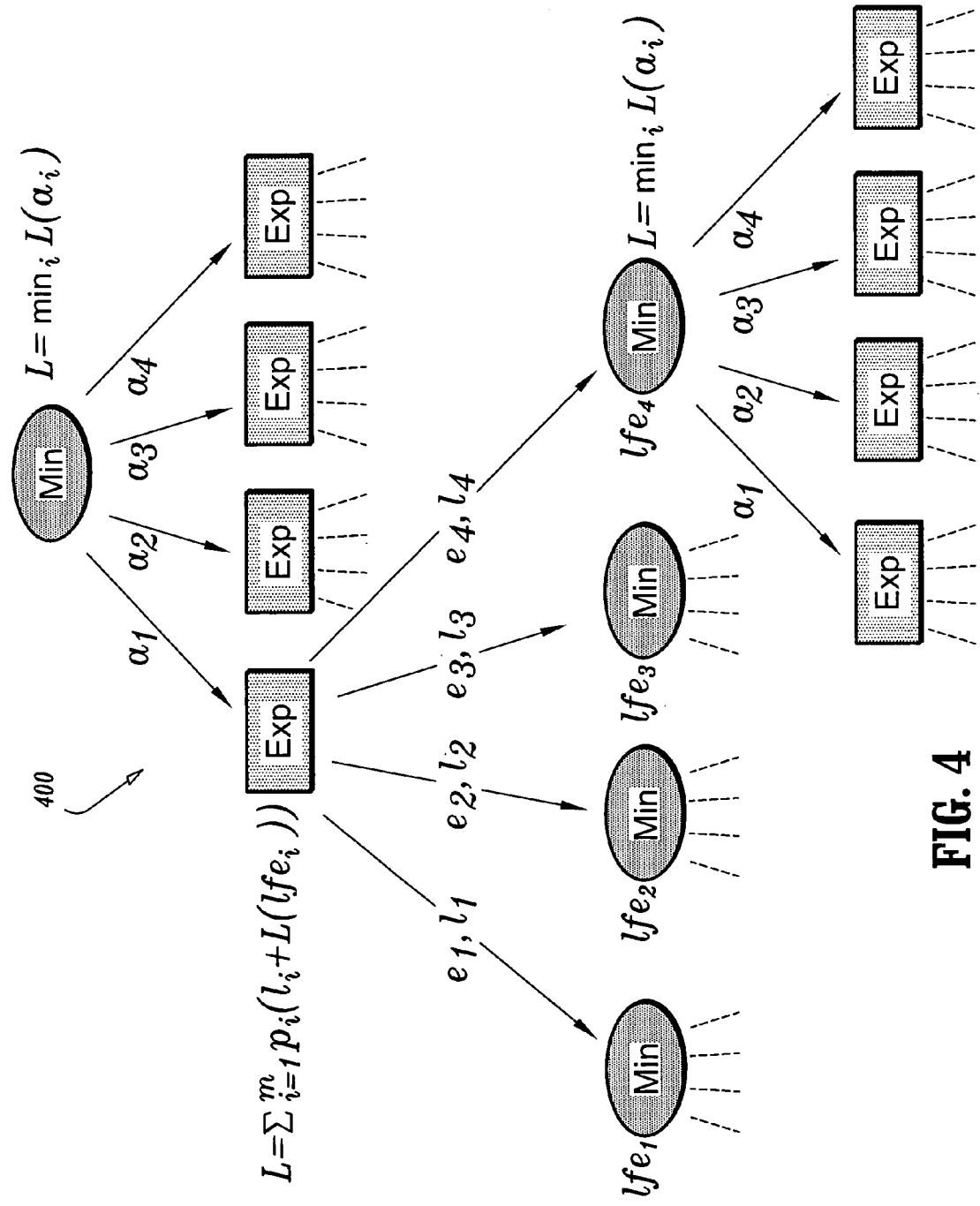
FIG. 4 shows a schematic diagram of a decision tree for scheduling in accordance with an illustrative embodiment of the present disclosure.

As shown in FIG. 4, a schematic decision tree for a scheduling problem is indicated generally by the reference numeral 400. The $a_t$ terms represent control actions by the system, and refer to scheduling a particular camera to a particular target. The $e_t$ terms represent events in the scene and refer to one out of the many random events that can occur during the time the control action is taken.

Figure 5:
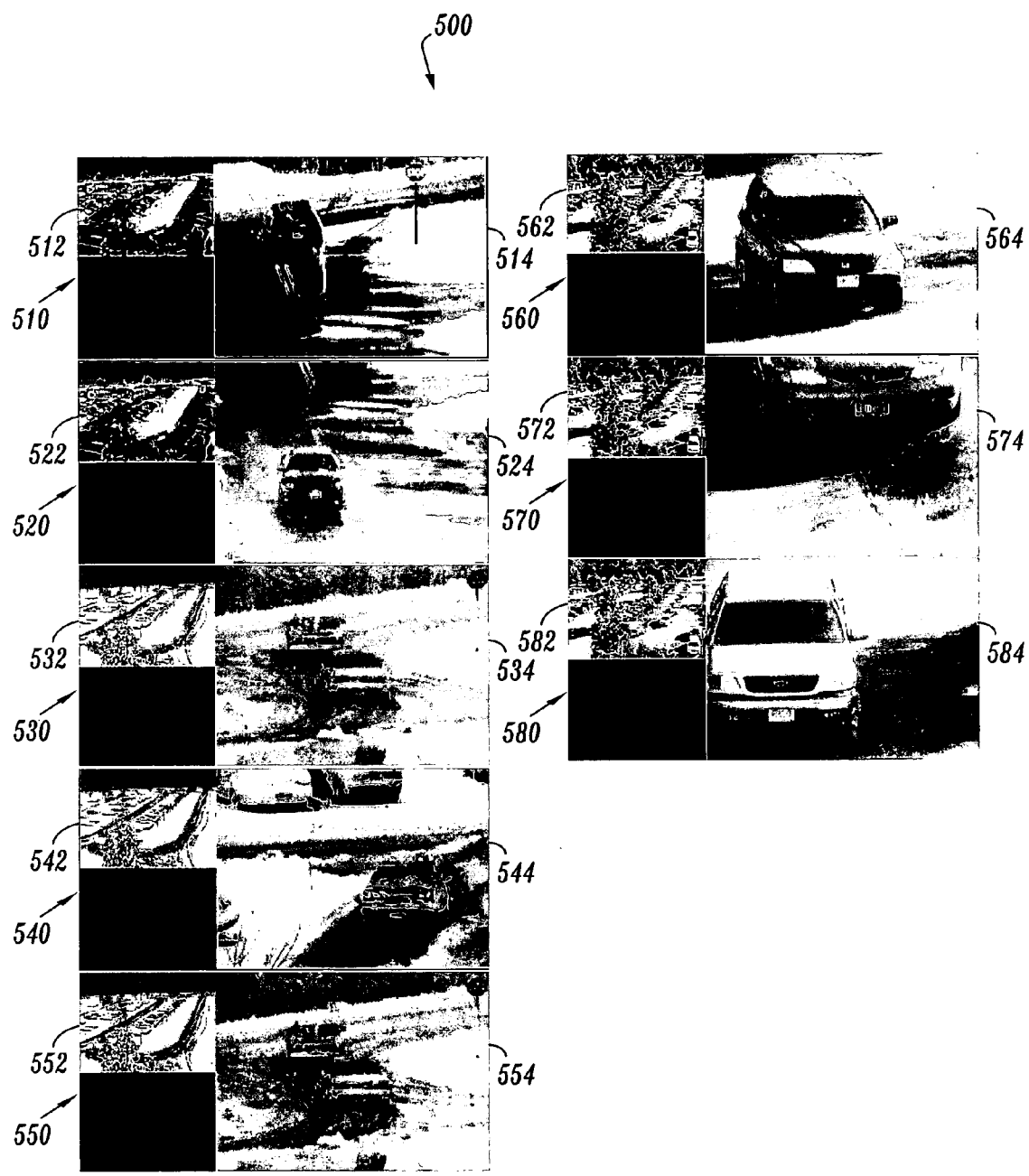
FIG. 5 shows an image sequence diagram with static/dynamic image pairs in accordance with an illustrative embodiment of the present disclosure.

Turning to FIG. 5, image results from the system are indicated generally by the reference numeral 500. The image results are shown here in pairs, with an image from the static camera displayed on the left side and a corresponding image from the dynamic camera displayed on the right side of each pair. That is, the right-hand side image is the high-resolution image captured by the PTZ camera. As such, the image pair 514, for example, includes a static image 512 and a dynamic image 514. Likewise, each of the other image pairs 524 through 584 includes a static image and a dynamic image. The system creates the time-stamped summary videos that selectively store all of the frames that have some activity occurring. Here, one time-stamped summary video taken in snowy weather includes the image pairs 514 through 554, while another time-stamped summary video taken in clear weather includes the image pairs 564 through 584. This can be used as a tool by security personnel to check past activities occurring during a given period of time, such as, for example, to determine if and when an anomalous activity occurred in a region and to capture high-resolution images of such activities automatically.

In operation, the exemplary embodiment system receives image data from static and dynamic cameras. In addition, the dynamic cameras may be utilized as static cameras by positioning them back to their default wide field-of-view position when there is no event of interest. The static cameras with a wide field of view and/or dynamic cameras in their static state are utilized to obtain high-level information about a large part of the scene. Such cameras may be placed to look at different parts of the scene, or at the same scene from different viewpoints to handle occlusion problems due to trees, poles and the like.

Object detection is performed in these views using background subtraction techniques. In addition, the system exchanges information between cameras to track objects across them. When the cameras have some overlapping area, such transfer is eased based on common appearances at a particular location. When the overlapping area is non-existent, more complex matching techniques are utilized based on circumstantial object appearance and shape characteristics. Information about the scene obtained from static cameras is used by the system to control the moving cameras to aim at detected objects of interest. Such information transfer across cameras is performed using planar homographies, which are able to transfer points lying on a plane.

Object detection is primarily accomplished using static cameras. The static cameras are preferably utilized for detecting objects of interest in the scene. Several methods are possible for change detection. The most popular methods are the Mixture-of-Gaussians model based methods and the non-parametric kernel based methods. The output from such method modules is a pixel-level detection measure that measures the probability that the pixel belongs to the background.

Object size priors are used for robust change detection. Information from the pixel-level detector is used for making higher-level decisions about object presence in the scene. Given the shape of the object sought, it is possible to obtain an approximate projection onto the image that the object will form. Objects that are closer appear larger than distant objects. If people are approximated by cylinders, such projection is invariant to the pose of the person. This, however, is not true for other objects such as cars, for example. Given such projections, a projection region is created that would be formed if the object was standing at that location, for each point on the ground plane. The system uses the information that an object presence at this location would lead to most of the pixels detecting change in the projection region. A threshold can then be set on the number of "on" pixels in this projection region.

Determining the number of "on" pixels in the projection regions of all possible points on the ground plane can be an expensive process if performed iteratively. Therefore, preferred embodiments use dynamic programming to efficiently find the "summations" for all of the projection regions. The essential idea is that the projection regions for consecutive points are generally of the same or similar sizes, but differ in their positions.

The summation is found in two steps. In one step, a horizontal summation is performed that sums the relevant pixels in the horizontal direction. In the other step, the summation is performed in the vertical direction. This is done if the horizontal summation regions do not change drastically with the change in the vertical region.

In order to perform the horizontal summation, it is observed that given the projection region for a location to the left of the current location, the projection region for the current location has one extra point on the right and one point less point on the left. Thus, determination of the summation for the current location involves one addition of the extra point and one subtraction of the redundant point. This can be performed very efficiently. A similar procedure in the vertical direction on the horizontal summations yields the complete 2D summation extremely efficiently.

Filtering via motion detection may be optionally implemented. The detections obtained via the above procedure can be further verified by tracking an object once it is initially detected. Many methods may be used for the purpose. Using this procedure, only objects that are successfully tracked for some time are counted as detected, while the rest are filtered out.

Information fusion may be accomplished between different static cameras. When some overlap exists between the views of different cameras, a ground-plane homography may be established for correspondence across them. This homography may be utilized for identifying common objects detected in multiple views.

Determining the control parameters of the PTZ cameras involves the aspects of transferring information across cameras, and predicting the new object position given the motion characteristics of the object.

In order to transfer point information from the static cameras to the PTZ cameras, a zoomed-out image is obtained from a PTZ camera and a homography correspondence is established between this view and the static cameras for the ground plane. A point in the static camera is first transferred to this view via the homography. Then, given the pan and tilt position of this reference view and the focal length of the lens in this position, the system can then determine the pan and tilt angles of the point with respect to the camera coordinate. Any two views from a PTZ camera having PTZ parameters such as pan angle $theta_i$, tilt angle $phi_i$, and focal length $f_i$ corresponding to zoom, are related by a homography H as indicated by Equations 1 through 3 of Table 1, where $f_x$ and $f_y$ are the focal lengths in the x and y directions, s is the skew and $u_x$ and $u_y$ are the location coordinates of the principal point in the image, and subject to Equations 4 and 5 of Table 1.

This transformation $x_2 = H \cdot x_1$ is first used to transfer the point from the current PTZ location to a location that has a tilt of zero. From a zero tilt position, the pan-tilt position to point the camera to this point becomes straightforward as indicated by Equations 6 and 7 of Table 1. These equations were derived using simple geometric considerations. These pan and tilt angles can then be used to point the camera at the desired point.

Predicting object location in a dynamic environment involves tracking the object position changes in the scene. Thus, during the time that the camera takes to go to the desired location, the object position changes. Such change necessitates prediction of the object position at the time the camera is predicted to move to the new location. Two methods are presented for prediction.

In the first method, a linear prediction uses the velocity of the object in order to predict the object position after the estimated camera control time delay. Such linear prediction can either be a simple scheme based on estimating the velocity using differences in object position, or can be slightly more complicated using a Kalman filter.

The linear prediction approach works quite well. However, it may fall short when the object undergoes a change from linear behavior, such as during acceleration. Such behavior is typical at a road intersection, for example. In order to improve upon the linear prediction mechanism in acceleration environments, a second approach learns the motion patterns of activities. Then, for each location and velocity of the object, the most probable location is predicted where the object should be observed after the expected control delay. The predicted location is then transferred to the PTZ camera for capture.

The zoom to be applied to the object should be such that it captures the object property of interest with the maximum possible zoom with the probability of losing the object not exceeding a given threshold. For instance, if one needs to capture a whole object such as a car, one needs to take the following into account:

1. Object Size: Larger objects need to be captured with lesser zoom as compared to smaller objects.
2. Error in object position localization: A larger error in the localization of the object position necessitates a lower zoom setting.
3. Prediction Error: A larger error in prediction of the object motion again necessitates a lower zoom setting
4. Transfer Error: Since only the points on the plane can be transferred, and the actual point that is transferred may not be on the plane, there is a localization error that appears due to the transfer process via the homography.

All of these errors can be quantized. First, the error in finding the point to be transferred needs to be determined in the original image. Typically, it is preferable to transfer the middle bottom point of the object. It may be assumed that the error in locating this point can be as much as $sigma^2_x = width^2/4$, $delta^2_y = height^2/4$, where the width and height of the detected object are used. In addition, the prediction error is estimated as a fixed constant of the object velocity $sigma^2_{pred} x = c_p \cdot v$. Given such errors, the error in localization of the point in the other image can be determined. Given the homography transformation as indicated by Equation 8 of Table 1, the error in the x and y coordinates $(x_2, y_2)$ in the second image can be estimated as indicated by Equations 9 and 10 of Table 1.

Once the point has been transferred and the error in the transfer has been estimated, one needs to localize the object characteristic that needs to be captured. For instance, if the license number plate is to be captured, it has to first be localized in the view of the other camera. Given the variability in the number plate positions, such error can be estimated as a fixed error $\Sigma_2$.

All these errors in localization can be added to determine the total error in localization of the object in the reference view of the PTZ camera. Such errors translate into an angular uncertainty for the PTZ camera as indicated by Equation 11 of Table 1, where alpha is the angle from the principal axis to the transferred point $(x_2, y_2)$. Such error in the angular orientation is then translated into the maximum zoom factor that still facilitates at least this much angular coverage.

When multiple objects are present in the scene, the cameras need to be scheduled so that a given criteria regarding the captured objects is satisfied. For instance, one may desire that the maximum number of objects be captured by the system. Another criteria could be to capture the largest object in the scene.

A generic framework is now provided for scheduling the cameras, given a certain criteria to be maximized. In order to do so, the motion pattern of the objects is learned. Given a particular location and velocity of the object, the future location of the object is determined. Since the objects can have multiple patterns of motion, multiple locations are determined with their respective frequencies or probabilities. Also determined is the estimated time for which the object remains visible after the current observation.

Given the learned model, a technique is used to maximize a given criteria for determining the optimum scheduling mechanism. Assume for now that the criteria is to maximize the number of captured objects, or equivalently, to minimize the number of uncaptured objects. In addition, assume that the objects appear randomly according to a given distribution, and disappear at specific locations at specific times according to the learned distribution. It is further assumed that a compound event $e_i$, where i=1 ... n occurs in the scene randomly according to the given distribution. Then, let $A=a_i$, where i=1 ... tau be a sequence of control actions taken by the system. Then, the problem can be formulated as indicated by Equation 12 of Table 1. That is, the optimum control strategy is the one that minimizes the average number of lost objects given a certain expected distribution for future events $e_i$.

Such a formulation would be optimal when there is no feedback from the system during the control process. Since there is constant feedback from the system, the formulation is modified into an incremental one. In an incremental formulation, one can construct a probabilistic expectimin decision tree as shown in FIG. 4 that captures the decision process. The idea is that at any given instant there is a set of control actions from which the system can choose. In the exemplary application, such control actions refer to pointing the PTZ camera towards a particular object in the scene. Such action has some time "cost" associated with it. The time cost includes the time taken by the camera to move to the new position. Such time is a function of the current position and the new position of the camera, and typically increases as the difference between the two increases.

The time cost also includes the time to capture the object. This is a function of the uncertainty in capturing the object. For instance, objects that are moving fast will typically have more uncertainty in their position as compared to stationary ones. Therefore, even when the camera moves to a predicted position, the probability that it has captured the object is low. On the other hand, slowly moving objects can be localized very accurately. Furthermore, if a certain property of the object is to be acquired, such as vehicle license plates, for example, there is uncertainty in the localization of the location to be acquired. Large objects like trucks or sport utility vehicles can have their number plates in very high and/or unpredictable locations. In such cases, multiple images may need to be acquired so that the probability that the plate has been captured in at least one of the views exceeds a given threshold. Such factors are included so as to determine the expected time that a particular control action will take.

After such action is performed, the current configuration of the scene may change randomly. For instance, some of the objects could have gone out of the field of view of the camera. Some new objects may have entered the scene. In addition, some of the characteristics of existing objects will have changed. All of these changes can be incorporated in to a single compound event $e_i$ that can occur with probability $p_i$. Associated with this event is also a loss $l_i$ that occurs because of the loss of objects that have left the scene uncaptured. The total loss L can be calculated as indicated by Equations 13 and 14 of Table 1

$L(If_{ei})$ is the loss in the leaf node of $e_i$ and is the expected loss that occurs after the event $e_i$ has taken place. In other words, the loss is computed for each possible event and the expected loss is calculated as the weighted sum of such losses with the weight being the expectation of the event. For each such event, the node is then again expanded to determine the expected loss occurring after the event. This process can be quite computationally expensive, especially when the number of objects is large. Therefore, the depth up to which this is computed is adapted to the number of objects in the scene. When multiple PTZ cameras are available, such a procedure can be extended by performing the computation after any of the cameras finishes its task.

As described, the exemplary embodiment system can be an important tool in automating monitoring and surveillance tasks in major and minor sites including parking lots, railway stations, subway stations, airports and for security in areas such as military installations, museums, shopping malls and homes, for example.

The video summary feature discussed with respect to FIG. 5 can be important in summarizing events during a given period of time, and hence automatically achieving great efficiency in storing video data, thereby enhancing the amount of useful data that can be stored for the same storage capacity. Furthermore, high resolution images of objects can be utilized for detailed object acquisition that can form the basis for more complex reasoning about objects such as recognition, camera handoff, video indexing, smart object search, and the like. One such application is to acquire images containing license plate numbers of cars, and then automatically reading the plates. This can then be utilized for automatic vehicle recognition, for example.

The features and methods provided may be adapted to a variety of applications where the high-resolution images of objects need to be obtained. For instance, in a law enforcement application, one may utilize a dual-camera system for obtaining high-resolution images of number plates that can then be fed into a character recognition engine for license plate recognition. Other possible application areas include industrial automation, traffic monitoring, and the like, as well as for tasks such as plane docking in airports, industrial automation in a variety of scenarios, and vision-based robotic systems.

These and other features and advantages of the present disclosure may be readily ascertained by one of ordinary skill in the pertinent art based on the teachings herein. It is to be understood that the teachings of the present disclosure may be implemented in various forms of hardware, software, firmware, special purpose processors, or combinations thereof.

Most preferably, the teachings of the present disclosure are implemented as a combination of hardware and software. Moreover, the software is preferably implemented as an application program tangibly embodied on a program storage unit. The application program may be uploaded to, and executed by, a machine comprising any suitable architecture. Preferably, the machine is implemented on a computer platform having hardware such as one or more central processing units (CPU), a random access memory (RAM), and input/output (I/O) interfaces.

The computer platform may also include an operating system and microinstruction code. The various processes and functions described herein may be either part of the microinstruction code or part of the application program, or any combination thereof, which may be executed by a CPU. In addition, various other peripheral units may be connected to the computer platform such as an additional data storage unit and a printing unit.

It is to be further understood that, because some of the constituent system components and methods depicted in the accompanying drawings are preferably implemented in software, the actual connections between the system components or the process function blocks may differ depending upon the manner in which the present disclosure is programmed. Given the teachings herein, one of ordinary skill in the pertinent art will be able to contemplate these and similar implementations or configurations of the present disclosure.

Although the illustrative embodiments have been described herein with reference to the accompanying drawings, it is to be understood that the present disclosure is not limited to those precise embodiments, and that various changes and modifications may be effected therein by one of ordinary skill in the pertinent art without departing from the scope or spirit of the present disclosure. All such changes and modifications are intended to be included within the scope of the present disclosure as set forth in the appended claims.

TABLE 1

$$H = K_2 * R_2 * R_1^{-1} * K_1^{-1} \quad \text{(Eqn. 1)}$$

where and $$R_i = \text{Rot}(\phi_i) * \text{Rot}(\theta_i) \quad \text{(Eqn. 2)}$$

$$K_i = \begin{bmatrix} f_z & s & u_z \\ 0 & f_y & u_y \\ 0 & 0 & 1 \end{bmatrix} \quad \text{(Eqn. 3)}$$

$$\text{Rot}(\theta) = \begin{bmatrix} \cos(\theta) & 0 & -\sin(\theta) \\ 0 & 1 & 0 \\ \sin(\theta) & 0 & \cos(\theta) \end{bmatrix} \quad \text{(Eqn. 4)}$$

and $$\text{Rot}(\phi) = \begin{bmatrix} 1 & 0 & 0 \\ 0 & \cos(\phi) & \sin(\phi) \\ 0 & -\sin(\phi) & \cos(\phi) \end{bmatrix} \quad \text{(Eqn. 5)}$$

$$\tan(\theta) = \frac{x}{f_z} \quad \text{(Eqn. 6)}$$

$$\tan(\phi) = \frac{y}{f_y \sec(\theta)} \quad \text{(Eqn. 7)}$$

$$H = \begin{bmatrix} h_1 & h_2 & h_3 \\ h_4 & h_5 & h_6 \\ h_7 & h_8 & h_9 \end{bmatrix}, \quad \text{(Eqn. 8)}$$

$$\sigma_{x_2}^2 = \frac{1}{(h_y x + h_8 y + h_9)}((h_1 \sigma_x^2 + h_2 \sigma_y^2) + \left(\frac{h_1 x + h_2 y + h_3}{h_7 x + h_8 y + h_9}\right)(h_7 \sigma_x^2 + h_8 \sigma_y^2)) \quad \text{(Eqn. 9)}$$

$$\sigma_{y_2}^2 = \frac{1}{(h_y x + h_8 y + h_9)}((h_4 \sigma_x^2 + h_5 \sigma_y^2) + \left(\frac{h_4 x + h_5 y + h_6}{h_7 x + h_8 y + h_9}\right)(h_7 \sigma_x^2 + h_8 \sigma_y^2)) \quad \text{(Eqn. 10)}$$

TABLE 1-continued $$\sigma_a = \frac{\sqrt{(\sigma_{x_2}^2 + \sigma_{y_2}^2)} \cos^2 \alpha}{f} \quad \text{(Eqn. 11)}$$

$$A^{opt} = \text{argmin}_A P(e_i) E(\text{loss}/e_i, A) \quad \text{(Eqn. 12)}$$

$$L = \min_i L(a_i) \quad \text{(Eqn. 13)}$$

where $$L(a_i) = \sum_{i=1}^{m} p_i(l_i + L(\text{lf}_{e_i})) \quad \text{(Eqn. 14)}$$

What is claimed is:

1. A method of image acquisition comprising:
receiving a static image from a fixed imaging device;
receiving a static image from a dynamic imaging device;
computing a first planar homography between the static images from the fixed and dynamic imaging devices;
receiving a dynamic image from the dynamic imaging device;
computing a second planar homography between the static image and the dynamic image from the dynamic imaging device;
registering the dynamic image from the dynamic imaging device to the static image from the fixed imaging device using the first and second planar homographies;
detecting an object of interest in at least one of the static and dynamic images;
directing the dynamic imaging device to adjust its zoom to capture a close-up of the object of interest; and
receiving another dynamic image from the imaging device, wherein the another dynamic image includes the close-up of the object of interest,
wherein an amount of zoom applied by the dynamic imaging device is based on a size of the object of interest, an error in finding a point of the object of interest to be transferred from the at least one of the static and dynamic images where the object was detected, an error in predicting the object of interest's motion and an error in localizing the point of the object of interest in the another dynamic image, wherein the localizing error is based on the prediction error and the finding error, and
wherein the method is performed using a processor.

2. A method as defined in claim 1 wherein the first planar homography is computed offline.

3. A method as defined in claim 1 wherein the fixed and dynamic imaging devices are cameras, further comprising transferring information between the fixed and dynamic cameras for geometric calibration of the cameras using planar homographies.

4. A method as defined in claim 1 wherein the fixed and dynamic imaging devices are cameras, the step of registering comprising online registration of the imaging received are from the dynamic camera when the camera moves by utilization of the camera parameters.

5. A method as defined in claim 1, further comprising:
projecting a trajectory for the object of interest; and
scheduling the dynamic imaging device in response to the projected trajectory.

6. A method as defined in claim 1, further comprising:
panning or tilting the dynamic imaging device based on characteristics of the object of interest.

7. A method as defined in claim 6 wherein the characteristics include the size of the object of interest.

8. A method as defined in claim 6 wherein the characteristics include the acceleration of the object of interest.

9. A method as defined in claim 1, further comprising:
storing each of the static and dynamic images in association with a timestamp.

10. A method as defined in claim 1 wherein user interaction is not required.

11. An apparatus for image acquisition comprising:
fixed imaging means for receiving static images;
dynamic imaging means for receiving static and dynamic images; and
homography means for registering the dynamic images to the static images,
wherein the homography means:
receives a static image from the fixed imaging means;
receives a static image from the dynamic imaging means;
computes a first planar homography between the static images from the fixed and dynamic imaging means;
receives a dynamic image from the dynamic imaging means;
computes a second planar homography between the static image and the dynamic image from the dynamic imaging means;
registers the dynamic image from the dynamic imaging means to the static image from the fixed imaging means using the first and second planar homographies;
detects an object of interest in at least one of the static and dynamic images;
directs the dynamic imaging device to adjust its zoom to capture a close-up of the object of interest; and
receives another dynamic image from the dynamic imaging device, wherein the another dynamic image includes the close-up of the object of interest,
wherein an amount of zoom applied by the dynamic imaging device is based on a size of the object of interest, an error in finding a point of the object of interest to be transferred from the at least one of the static and dynamic images where the object was detected, an error in predicting the object of interest's motion and an error in localizing the point of the object of interest in the another dynamic image, wherein the localizing error is based on the prediction error and the finding error.

12. An apparatus as defined in claim 11, the apparatus further comprising:
detection means for detecting the object of interest in the at least one of the static and dynamic images;
probable path projection means for projecting a trajectory for the object of interest; and
control means for scheduling the dynamic imaging device in response to the projected trajectory and
display means for displaying the object of interest.

13. A system for image acquisition, comprising:
a processor;
an imaging adapter in signal communication with the processor for receiving image data from each of a fixed imaging device and a dynamic imaging device; and
a homography unit in signal communication with the processor for computing a planar homography between the static and dynamic image data,
wherein the homography unit:
receives a static image from the fixed imaging device;
receives a static image from the dynamic imaging device;
computes a first planar homography between the static images from the fixed and dynamic imaging devices;
receives a dynamic image from the dynamic imaging device;
computes a second planar homography between the static image and the dynamic image from the dynamic imaging device;
registers the dynamic image from the dynamic imaging device to the static image from the fixed imaging device using the first and second planar homographies;
detects an object of interest in at least one of the static and dynamic images;
directs the dynamic imaging device to adjust its zoom to capture a close-up of the object of interest; and
receives another dynamic image from the dynamic imaging device, wherein the another dynamic image includes the close-up the object of interest,
wherein an amount of zoom applied by the dynamic imaging device is based on a size of the object of interest, an error in finding a point of the object of interest to be transferred from the at least one of the static and dynamic images where the object was detected, an error in predicting the object of interest's motion and an error in localizing the point of the object of interest in the another dynamic image, wherein the localizing error is based on the prediction error and the finding error.

14. A system as defined in claim 13, further comprising a trajectory unit in signal communication with the processor for projecting the trajectory of the object of interest, and scheduling the dynamic imaging device in accordance with the trajectory.

15. A system as defined in claim 14, further comprising a display adapter in signal communication with the processor for displaying the object of interest.

16. A system as defined in claim 15, further comprising a user interface adapter for checking image quality.

17. A system as defined in claim 13 wherein the object of interest is indicative of a vehicle.

18. A program storage device readable by machine, tangibly embodying a program of instructions executable by the machine to perform program steps for image acquisition, the program steps comprising:
receiving a static image from a fixed imaging device;
receiving a static image from a dynamic imaging device;
computing a first planar homography between the static images from the fixed and dynamic imaging devices;
receiving a dynamic image from the dynamic imaging device;
computing a second planar homography between the static image and the dynamic image from the dynamic imaging device;
registering the dynamic image from the dynamic imaging device to the static image from the fixed imaging device using the first and second planar homographies;
detecting an object of interest in at least one of the static and dynamic images;
directing the dynamic imaging device to adjust its zoom to capture a close-up of the object of interest; and
receiving another dynamic image from the dynamic imaging device, wherein the another dynamic image includes the close-up of the object of interest,
wherein an amount of zoom applied by the dynamic imaging device is based on a size of the object of interest, an error in finding a point of the object of interest to be transferred from the at least, one of the static and dynamic images where the object was detected, an error in predicting the object of interest's motion and an error in localizing the point of the object of interest in the another dynamic image, wherein the localizing error is based on the prediction error and the finding error.

19. A device as defined in claim 18, the program steps further comprising:

projecting a trajectory for the object of interest; and scheduling the dynamic imaging device in response to the trajectory.

20. A device as defined in claim 18, the program steps further comprising:

panning or tilting the dynamic imaging device based on characteristics of the object of interest.

21. A device as defined in claim 18, the program steps further comprising:

detecting an object of interest in at least one of the static and dynamic images; and storing each of the static and dynamic images in association with a timestamp.

22. A device as defined in claim 20, wherein the characteristics include the size of the object of interest or the acceleration of the object of interest.

* * * * *